April 30, 1940. A. C. LINK Re. 21,439

GRIPPING MEMBER FOR GOLF CLUBS

Original Filed June 3, 1935

Inventor

Albert C. Link

Eugene C. Brown

Attorney

Reissued Apr. 30, 1940 Re. 21,439

UNITED STATES PATENT OFFICE 21,439

GRIPPING MEMBER FOR GOLF CLUBS

Albert C. Link, Oak Park, Ill.

Original No. 2,088,008, dated July 27, 1937, Serial No. 24,736, June 3, 1935. Application for reissue July 21, 1939, Serial No. 285,826

4 Claims. (Cl. 273—81)

This invention relates to golf clubs and particularly to the handle or gripping member of the golf club shaft, having for its object to provide a left hand form-fitting structure having a configuration which serves as a definite guide to the proper placement of the left hand, and which causes the thenar muscles to contact and reinforce the position of the fingers of the left hand grip, insuring compactness of the left hand while avoiding the objectionable tension of the muscles of the left hand and forearm frequently occasioned by the ordinary golfer in gripping the club too tightly.

The experts and masters in the science and art of this most interesting and popular game, have developed a definite realization that correct gripping is the fundamental principle of importance to control proper timing and accuracy throughout the entire swing or stroke. The most difficult and uncertain procedure of the inexperienced player attempting to execute the first and fundamental step in the preparation of a golf stroke, is due to his uncertainty of how to properly contact the handle of the club with his left hand, and unless this position is acquired and is reasonably accurate, the right hand grip cannot be set to properly function in harmony with the left.

The back stroke of a swing is in reality the process of winding up or storing energy to attain the power which is released and amplified in the downward motion of the stroke. Complete control in gripping, especially with the left hand at the top or extreme of the back swing and throughout the forward stroke, is imperative to power, accuracy and correct timing. Any weakening or shifting of the grip of the left hand throughout the swing until after impact with the ball, can only result in failure.

The principal object of my invention is to provide a left hand form-fitting structure built into the golf club handle proper, or applied thereto, that will not only enable any player to correctly grip the club with the left hand but will at the same time afford every comfort and ease to firm and proper gripping throughout the entire swing or stroke, thereby accentuating power and control.

The above and other objects of my invention will be more clearly understood from the following detailed description in connection with the accompanying drawing, in which—

Figure 1:
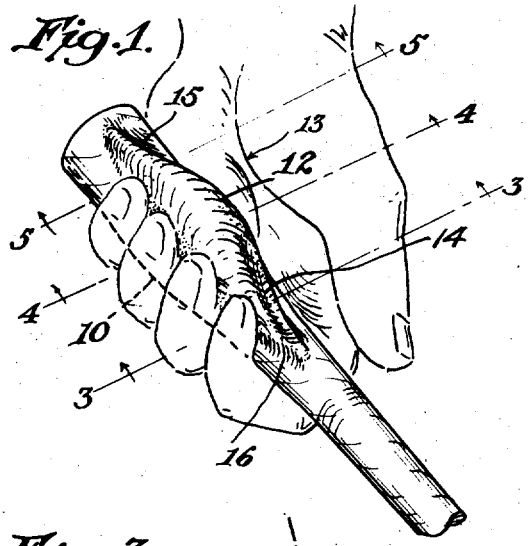
Figure 1 is a perspective view illustrating the position of a golfer's left hand in grasping my improved handle, before closing his grip.
Figure 2:
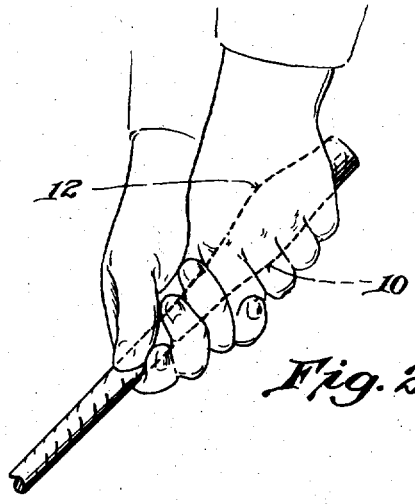
Figure 2 is a perspective view showing the position of both hands grasping my improved handle.
Figure 3:
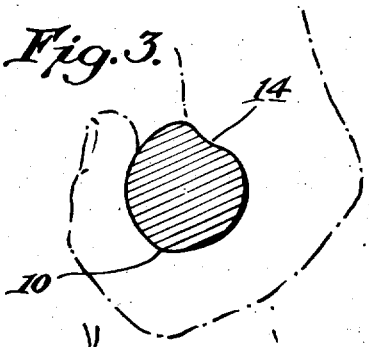
Figure 4:
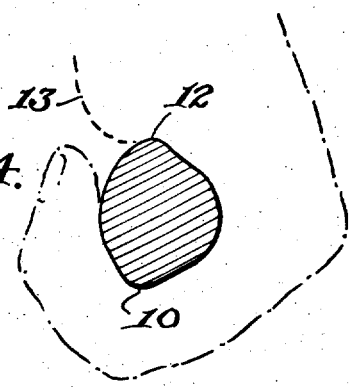
Figure 5:
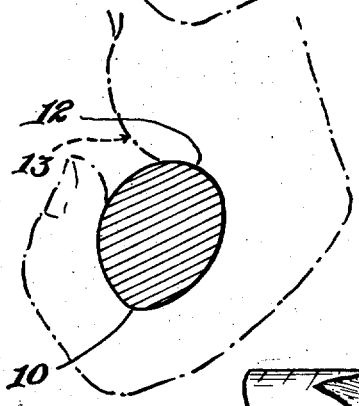

Figures 3, 4 and 5 are sectional views taken on the lines 3—3, 4—4 and 5—5, respectively, of Fig. 1.

Figure 6:
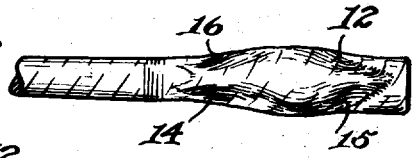
Figure 7:
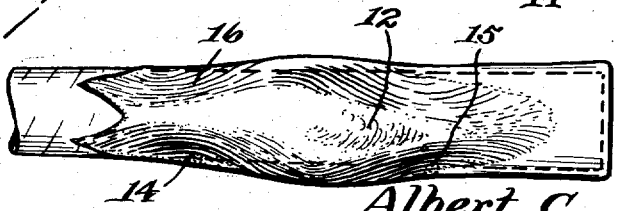

Figure 6 is a longitudinal front view, partly broken away, of a golf club provided with my improved left hand grip handle; and Figure 7 is a longitudinal front view of my improved left hand grip formed as an attachment to be applied to the handle of the usual golf club.

In my left hand grip structure, I provide raised surfaces of greater length than breadth to act as a definite guide to the proper placement of the left hand. The right hand will naturally follow in customary co-relation on the remaining circular portion of the grip.

A projecting convex bulge 10, on the under side of the grip handle allows the fingers to naturally flex themselves to the grip by so fitting on to the longitudinally convex structure, while in the act of gripping with the fingers thus, and are reinforced by the compensating longitudinal bulge 12, on the upper part of the grip handle which "fills out" or "fills in" the natural hollow of the palm created by flexed finger gripping, and is so formed to allow the thenar eminence 13, of the thumb of the left hand to overlap this bulge. The concave conformity curve 14, integral to the main curve, introduced to support the base of the forefinger of the left hand during the act of gripping in conjunction with the substantially convex bulge or structures, provided for the overlapping thenar eminence or muscles, give a positive two point hand re-inforcement to the third or all important point of left hand gripping resulting in a positive three point brace 10, 12, 14, of triangular shape which insures a positive left hand grip action of great strength. The remainder of the handle accommodating the right hand being of the conventional circular type.

The conformity curve 14, integral to the main curve, is introduced to support the base of the forefinger of the left hand during the act of gripping in conjunction with the substantial convex structure provided for the over-lapping thenar eminence.

This lower border of the thenar eminence point of contact to the handle of the club, with the muscles of the thenar eminence over-lapping the crest of my left hand grip structure, gives a positive support to the left hand grip, thus maintaining proper functioning of the grip during the complete swing. The rear portion of the finger control grip is curved inwardly at 15 to fit the heel of the left hand. The forward portion is curved inwardly at 16 to fit the under curve of the first joint of the left thumb.

The over-lapping contact of the thenar muscles of the left hand not only supports the finger grip to a positive degree, but it is also the means of producing greater power with the left hand, arm and complete left side on the down stroke, definitely aiding in keeping the proper direction throughout the natural arc of the swing or stroke.

When the left hand control grip is constructed as a separate attachment, as indicated in Fig. 7, it constitutes a unit to be attached to the handle of the ordinary golf club and may be fixed or made adjustable with relation to the club shaft. It may form an end grip plug that can be inserted into the opening of the steel shaft handle and be securely anchored, acting as a foundation for any suitable wrapping or as a completed preformed grip plug.

The advantages of my left hand control golf grip will be appreciated by expert players as being anatomically correct, conforming physically to the hand and insuring maximum strength and accuracy during the swing. The grip construction disclosed herein insures the correct positioning of the left hand over the upper and lower longitudinally convex structures with the thenar muscles contacting and re-inforcing the position of the fingers of the left hand grip, insuring the compactness of the fingers of the grip while avoiding the creation of objectionable tension of the muscles of the left hand and fore arm.

The upper and lower longitudinally convex structures are arranged at a desired angle to the face of the golf club head, so that when the hands are in position, the face of the head will contact with the ball at a substantial angle which is normal to a straight line drawn between the ball and the point of destination.

I claim and desire to secure by Letters Patent—

1. A gripping handle for a golf club, comprising oppositely disposed longitudinally arranged convexly curved projecting portions of greater length than breadth which are shaped and positioned to engage respectively the thenar eminence under the thumb and the concave curve of the fingers of the left hand when flexed into gripping position and a concavely curved portion shaped and positioned to receive the basal eminence of the forefinger of the left hand, whereby said preformed gripping portions coact in triangular relation to insure the desired position of the left hand upon the club, the remainder of the handle accommodating the right hand being of the conventional circular construction.

2. A gripping handle for a golf club, comprising a tapering convexly curved projecting portion shaped and positioned to fit the space in the palm of the left hand created by flexing the fingers of the hand over the club handle, a recessed portion shaped and positioned to receive the basal eminence of the fore-finger of the hand and a longitudinally arranged convexly curved projecting portion shaped and positioned to be engaged by the thenar muscles of the thumb of the left hand, and having an inwardly curved portion adjacent the rearward part of said last named portion to receive the heel of the left hand and thereby prevent longitudinal slipping of the club in the hand, the remainder of the handle accommodating the right hand being of the conventional circular construction.

3. A gripping member for attachment to the conventional circular handle of a golf club to accommodate only the left hand of an operator, comprising a hollow base portion provided exteriorly with a longitudinally arranged convexly curved projecting portion shaped and positioned to fit into the space in the palm of the left hand created by flexing the fingers of the hand over the club handle, a recessed portion shaped and positioned to receive the basal eminence of the forefinger of the hand and a longitudinally arranged convexly curved projecting portion shaped and positioned to be engaged by the thenar eminence under the thumb of the hand.

4. A gripping member adapted to accommodate the left hand of a golfer when grasping a golf club, comprising an elongated pad of resilient material disposed to fill the hollow in the palm of the golfer's hand formed by the closing of the hand, said pad being crescent shaped in transverse section, tapering in thickness from the central portion transversely to a thin edge at its side edges and tapering in thickness longitudinally from the central portion to a thin edge at its ends, and extending diagonally of the golfer's palm when positioned on the club, said pad being long enough to extend substantially the width of the hand, and being adapted to partially encircle the shaft of the club with its longitudinal axis in parallel relation with the axis of the shaft.

ALBERT C. LINK.